(12) United States Patent
Badar

(10) Patent No.: US 10,476,920 B2
(45) Date of Patent: Nov. 12, 2019

(54) ENHANCED TELEPHONY APPLICATION SERVER SESSION MANAGEMENT

(71) Applicant: T-Mobile USA, Inc., Bellevue, WA (US)

(72) Inventor: Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 15/610,225

(22) Filed: May 31, 2017

(65) Prior Publication Data

US 2018/0352013 A1 Dec. 6, 2018

(51) Int. Cl.
*H04L 12/16* (2006.01)
*H04Q 11/00* (2006.01)
*H04L 29/06* (2006.01)

(52) U.S. Cl.
CPC ...... *H04L 65/1096* (2013.01); *H04L 65/1006* (2013.01); *H04L 65/1016* (2013.01); *H04L 65/1063* (2013.01); *H04L 65/1069* (2013.01)

(58) Field of Classification Search
CPC ............. H04L 65/1096; H04L 65/1006; H04L 65/1016; H04L 65/1063; H04L 65/1069
See application file for complete search history.

(56) References Cited

U.S. PATENT DOCUMENTS

| | | | | |
|---|---|---|---|---|
| 2005/0125543 A1* | 6/2005 | Park | ................ | H04L 29/06027 709/227 |
| 2008/0270618 A1* | 10/2008 | Rosenberg | .......... | H04L 65/1069 709/228 |
| 2008/0316931 A1 | 12/2008 | Qiu et al. | | |
| 2015/0271340 A1* | 9/2015 | Yu | ............................ | H04W 4/16 455/417 |
| 2015/0312281 A1 | 10/2015 | Martinez et al. | | |
| 2016/0029228 A1 | 1/2016 | Mufti | | |
| 2016/0156783 A1 | 6/2016 | Mufti et al. | | |
| 2016/0219465 A1 | 7/2016 | Lei | | |
| 2016/0330320 A1* | 11/2016 | Ghuli | .................... | H04M 3/465 |
| 2017/0094564 A1* | 3/2017 | Sharma | ............ | H04W 36/0022 |

OTHER PUBLICATIONS

Wikipedia (List of SIP response codes, revised on Mar. 17, 2017) (Year: 2017).*
Holmberg et al. (Session initiation protocol (SIP) response code for indication of terminated dialog, May 2011, see figure 1-3, which entails forked call and their responses. (Year:2011).*
PCT Search Report and Written Opinion dated Sep. 18, 2018 for PCT Application No. PCT/US18/31864, 10 pages.

* cited by examiner

*Primary Examiner* — Maharishi V Khirodhar
(74) *Attorney, Agent, or Firm* — Lee & Hayes, P.C.

(57) ABSTRACT

A solution for an enhanced telephony application server session management is described herein. A TAS may fork an incoming invite for packet switched connectivity to all user devices of a same user account registered for parallel forking. When receiving a SIP client failure response from one of the user device, TAS will determine whether a SIP 18X provisional response is received prior to the client failure response from the same user device. If such a provisional response is not received prior to the client failure response, TAS will not terminate the invite forking.

16 Claims, 5 Drawing Sheets

ENHANCED TELEPHONY APPLICATION SERVER SESSION MANAGEMENT

BACKGROUND

The IP Multimedia Subsystem or IP Multimedia Core Network Subsystem (IMS) is an architectural framework for delivering IP multimedia services. IMS uses Internet Engineering Task Force (IETF) protocols for transactions and the managements thereof, predominantly the Session Initiation Protocol (SIP). In IMS architectures, a Serving Call Session Control Function (S-CSCF) server and an Application Server, which in a case of telephony services, is also referred to as Telephony Application Server (TAS), are critical functions in controlling packet switched connectivity for a service(s) session, e.g., a voice call session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

1. Overview

Figure 1:
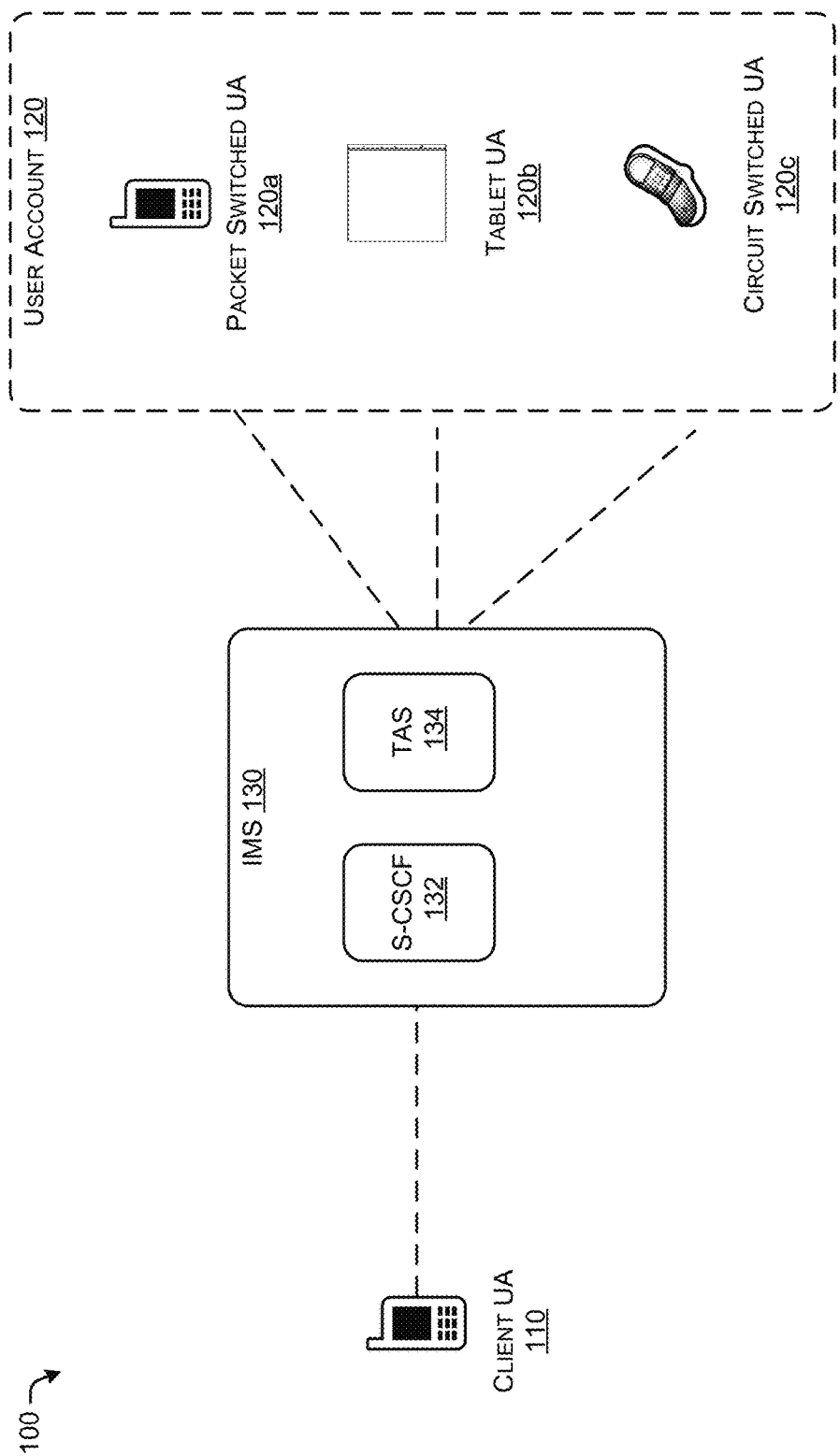
FIG. 1 illustrates an example environment.

The systems, devices, and techniques described herein are directed to providing an enhanced telephony application server session management solution. FIG. 1 illustrates an example operation environment 100. Example client user agent/device 110 may be linked to server user agents of SIP, here, for example, server UAs 120*a*, 120*b* and 120*c* under a same user account 120, through IMS 130 via SIP message exchanges. Note that in IMS, a user device may function both as a client and as a server depending whether it initiates an invite (client) or receives and responds to an invite (server). IMS 130 is illustrated as including an S-CSCF 132 and an TAS 134, although other components of an IMS architecture are also included.

The association of multiple user agents/devices 120*a*, 120*b* and 120*c* through the same user account 120 may include the scenarios of: (A), a single telephone number shared by multiple devices with multiple SIM cards, and/or (B), multiple devices with multiple native numbers linked via a same account with a same virtual number (i.e., native/virtual lines). In both scenarios A and B, the user account 120 may show to client UA 110 with a same dial-in number. Other scenarios of multiple user devices associated together under a same user account are also possible and included in the disclosure. For example, circuit switched UA 120*c* may have a voice call forwarding association with a packet switched UA 120*a* based on a SIM card of packet switched UA 120*a*. Further, a user account 120 may include a combination of multiple scenarios of device association, e.g., scenario A and scenario B above may co-exist within a user account 120.

When receiving a voice call invite from client UA 110 for user account 120, TAS 134 may apply the call forking logic to relay the invite to each of multiple user devices of user account 120, which are registered for parallel forking. Note that TAS 134 may apply both parallel forking and sequential forking for the associated server UAs under various registration scenarios. For illustrative example, it is assumed that user account 120 provides that packet switched UA 120*a* and tablet UA 120*b* are registered for parallel forking and for sequential forking prior to circuit switched UA 120*c* registered for sequential forking later.

Figure 2:
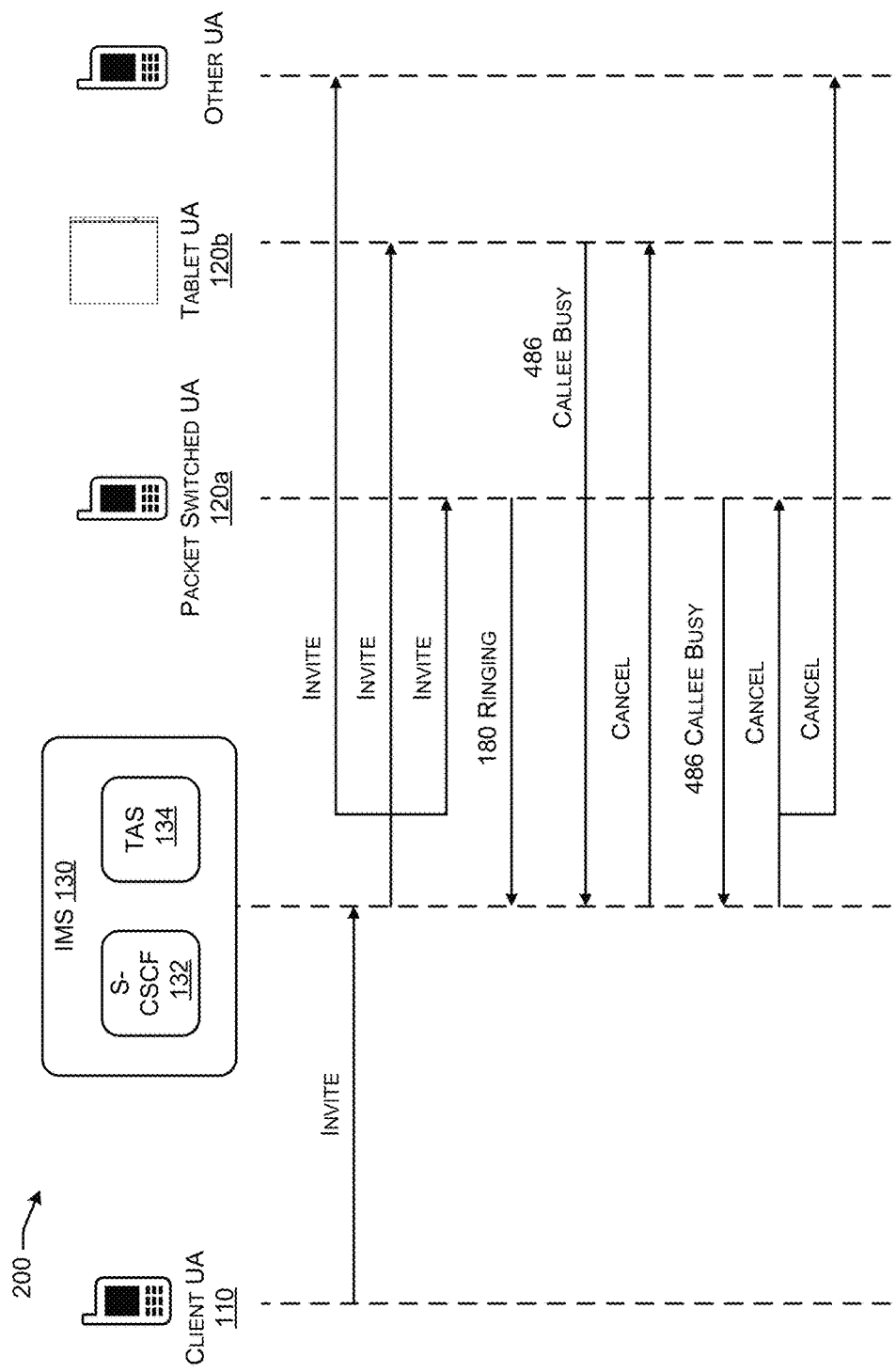
FIG. 2 illustrates an example voice call invite and response transaction process.

FIG. 2 illustrates an example message exchange scenario for the parallel forking, where TAS 134 forks the incoming call invite to each of the UA devices 120*a*, 120*b* and other UA(s) registered for ringing in parallel. Under traditional approaches, if one of the server UA instance, e.g., 120*a* or 120*b*, rejects the incoming call, TAS 134 will send SIP CANCEL to all the UA instances of parallel forking where it has sent SIP INVITE to stop ringing.

However, user devices/agents registered for parallel forking may include various combination of capacities and registration status (i.e., configurations) for various services of connectivity. Some user devices, e.g., tablet UA 120*b*, may be configured for a network connectivity other than a packet switched based voice call connectivity, and may include no packet switched voice call connectivity configuration, and thus may respond to an SIP invite differently than a packet switched UA, e.g., 120*a*. For example, there can be user agents/devices that support data over LTE network and support register on circuit switched (CS) domain only for the purpose of receiving incoming messages for a brief period of time. For such a user device, e.g., tablet UA 120*b*, upon receiving incoming voice call invite/request from TAS 134, the paging will fail resulting in a user busy error that translates to SIP code 486 response. Traditionally, such code 486 response will result in SIP CANCEL message be sent to other user devices, e.g., UA 120*a*, which are still in the process of setting up a voice call session.

Under the enhanced solution(s) of this disclosure, in the scenario of parallel forking, if TAS 134 receives a SIP code 4XX client failure response from a user device of parallel invite forking, TAS 134 may check whether a SIP code 18X provisional response, e.g., a code 180 (Ringing) response, has already been received from the same user device prior to the SIP 4XX client failure response. In a case that a SIP 18X provisional response has not been received prior to the client failure response from the same user device, TAS 134 may continue normally with other user devices for which it has sent the SIP INVITE to allow a possibility of voice call setup on other available user devices.

As shown in FIG. 2, TAS 134 forks an invite/request for packet switched connectivity of voice call to packet switched UA 120*a* and tablet UA 120*b* which include no packet switched voice call connectivity configuration, along with other UA(s). Packet switched UA 120*a* returns a SIP 18X provisional response, e.g., a SIP code 180 (Ringing) response. Then a SIP code 486 (Callee Busy) response is returned from tablet UA 120*b*. Determining that there is no provisional response received from tablet UA 120*b* prior to the code 486 response, TAS may continue the invite forking session with packet switched UA 120*a* and the other UA(s) and cancel the invite only with tablet UA 120*b*. Then a SIP code 486 response, for example, is received from packet switched UA 120*a*. Determining that a provisional response 180 has been received from packet switched UA 120*a* before the code 486 response, TAS 134 may terminate the invite with all the remaining server UAs 120*a* and other UA(s), and, for example, apply Call forwarding, if it is included in the service subscription.

2. Example Devices

Figure 3:
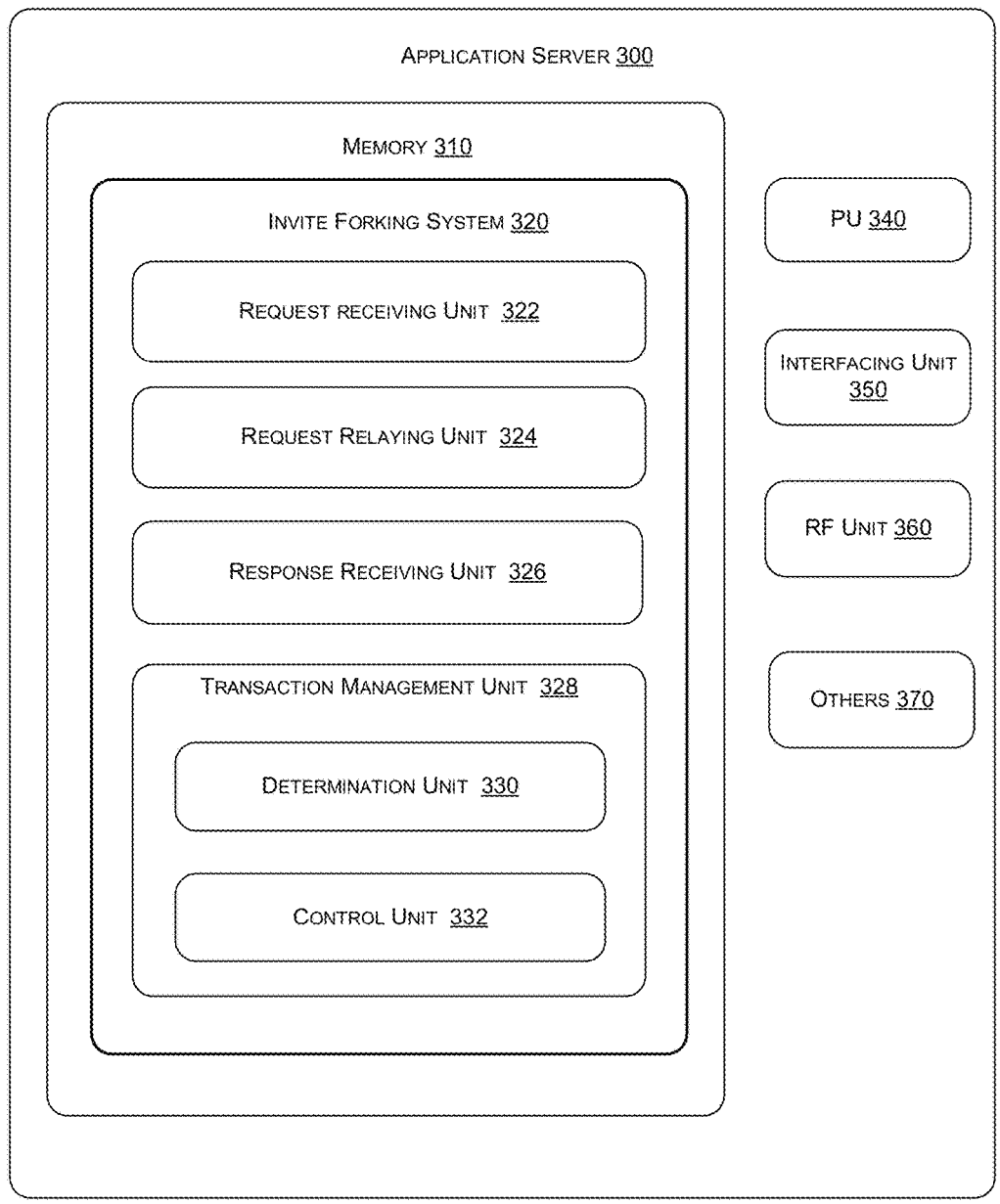
FIG. 3 illustrates an example application server.

FIG. 3 illustrates a system diagram showing aspects of an illustrative example application server 300. Application server 300 may be used to implement TAS 134 and/or S-CSCF 132 and/or other components of IMS 130 of FIG. 1. As shown in FIG. 3, application server 300 may include a memory (memories) 310 containing computer executable instructions which, when executed by a processing unit, configures the processing unit to implement an invite forking system 320. Invite forking system 320 may include a request receiving unit 322, a request relaying unit 324, a response receiving unit 326 and a transaction management unit 328. Transaction management unit 328 may further include a determination unit 330 and a control unit 332.

Application server 300 may further include a processing unit(s) ("PU") 340, an interfacing unit 350, an RF unit 360 and other components 370.

It should be appreciated that units of application server 300 may reside on a single computing device, e.g., a server device, or in multiple computing devices in a distributed computing environment/system, and all are included in the disclosure. Further details of a computing device or a distributed computing environment is not required to understand the disclosure and do not limit the scope of the disclosure.

Figure 4:
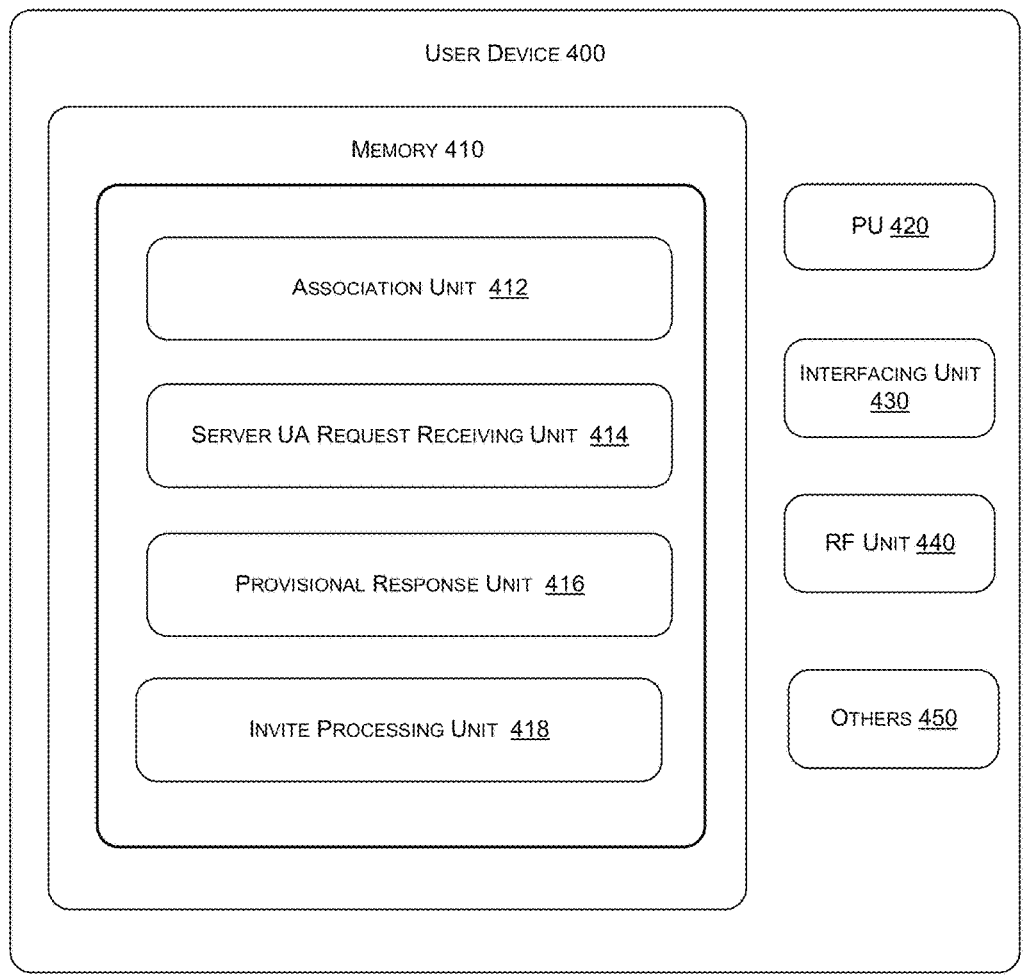
FIG. 4 illustrates an example user device.

FIG. 4 shows an example user device 400. Example user device 400 may implement a packet switched UA 120a of FIG. 1. User device 400 may include a memory (memories) 410 containing computer executable instructions which, when executed by a processing unit, configures the processing unit to implement an association unit 412, a server UA request receiving unit 414, a provisional response unit 416 and an invite processing unit 418. User device 400 may also include a processing unit(s) ("PU") 420, an interfacing unit(s) 430, an RF unit(s) 440 and other components 450. In an example, user device 400 is configured to be compliant with and registered under Session Initiation Protocol (SIP).

Referring to FIGS. 3-4 together, in operation, request receiving unit 322 of invite forking system 320 may be configured/operable to receive an invite (request), e.g., from client UA 110, for a packet switched connectivity for a voice call to an associated user account, e.g., user account 120, that includes multiple user devices/agents, e.g., 120a, 120b and 120c, associated with one another.

For example, user device 400 may be used to implement packet switched UA 120a of user account 120. Association unit 412 of user device 400 may be configured/operable to function together with a server of a service provider to associate user device 400 (as UA 120a) with another user device having no packet switched voice call connectivity configuration, e.g., tablet UA 120b and/or circuit switched UA 120c of FIG. 1, under the same user account 120.

Request relaying unit 324 may be configured/operable to relay the invite/request to each of the multiple user devices, e.g., server UAs 120a, 120b, and 120c. The relaying of the invite to the multiple user devices may be performed sequentially or may be performed in parallel, e.g., substantially simultaneously, or may include a combination of both. The relayed invite may be a Session Initiation Protocol (SIP) invite message.

Server UA request receiving unit 414 may be configured/operable to receive the SIP invite from application server 300. The receiving may be under any approach(es) provided by the SIP specifications/provisions, and all are included in the disclosure.

Provisional response unit 416 may be configured/operable to return a provisional response to sever 300. The provisional response may be a SIP code 18X response, e.g., 180 (Ringing), 181 (Call Is Being Forwarded), 182 (Queued) and/or 183 (Session Progress).

Invite processing unit 418 may be configured/operable to continue processing the received SIP invite message despite/after an associated UA that has no packet switched voice call connectivity configuration, e.g., tablet UA 120b, returning a client failure response, e.g., code 486 (Callee Busy) response, to server 300. Any approaches may be used to implement the continued processing function(s), and all are included in the disclosure. For example, the continued processing may be based on that no request/invite cancelling and/or termination message is received from server 300. In another example, the association between packet switched UA 120a and tablet UA 120b (which does not have packet switched voice call connectivity configuration) may provide that a client failure response from tablet UA 120b does not stop the processing of the SIP invite message at packet switched UA 120a.

Response receiving unit 326 may be configured/operable to receive a response from a server UA, e.g., server UAs 120a, 120b and/or 120c, including a client failure response. For example, a client failure response may be a code 486 response indicating Callee Busy on the specific UA.

Transaction management unit 328 may be configured/operable to manage the packet switched connectivity transaction based on SIP responses received by response receiving unit 326. Specifically, determination unit 330 may be configured/operable to determine whether a provisional response is received from a user agent/device prior to a client failure response received from the same user agent/device.

Control unit 332 may be configure/operable to control the processing and/or status of the packet switched connectivity transaction based on a determination result of determination unit 330. For example, if it is determined that a provisional response is not received from a user device prior to a client failure response received from the same user device, control unit 332 may cause to maintain the relaying/forking of the invite request to other ones of the multiple user devices in lieu of the received client failure response. If it is determined that a provisional response has been received from a user device prior to a client failure response received from the same user device, control unit 332 may cause to terminate the relaying of the invite with respect to all of the multiple user devices in a parallel forking, responsive to the received client failure response.

Further, transaction management unit 328 may be configured/operable to identify and record a user device as having no packet switched connectivity configuration for voice call service based on that the user device returns a client failure response without a prior provisional response.

3. Example Processes

Figure 5:
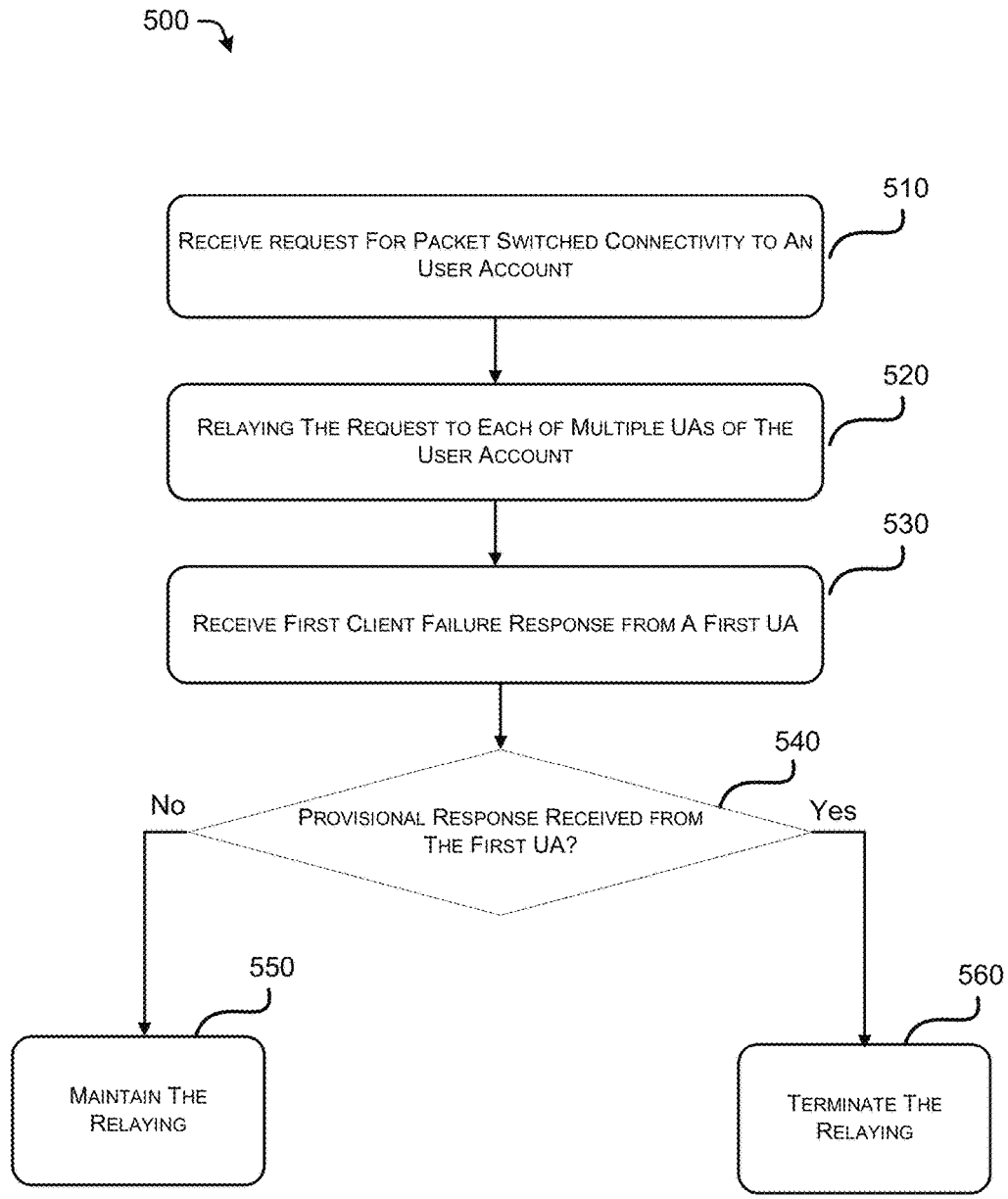
FIG. 5 illustrates an example operation process.

FIG. 5 illustrates example operation process(es) 500. The operation processes are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIGS. 1-3 and 5 together, in example operation 510, request receiving unit 322 of invite forking system 320 may receive an invite (request), e.g., from client user agent 110, for a packet switched connectivity for a voice call to an associated user account, e.g., user account 120, that includes multiple user devices/agents, e.g., 120a, 120b and 120c, associated with one another.

In example operation 520, request relaying unit 324 may relay the invite/request to each of the multiple user devices registered for parallel forking, e.g., server UAs 120a, 120b, and 120c. The relaying of the invite to the multiple user devices may be performed sequentially or may be performed in parallel, or may include a combination of both. The relayed invite may be a Session Initiation Protocol (SIP) invite message. It should be appreciated that before the relaying, multiple procedures may be performed to comply with the SIP standard provisions, e.g., to authenticate client UA 110. The relaying and/or relayed invite/request message may include different content and/or format than the invite/request received from client UA 110.

In example operation 530, response receiving unit 326 may receive a client failure response, e.g., a code 486 (Callee Busy) response, from a server UA, e.g., tablet UA 120b.

In example operation 540, determination unit 330 may determine whether a provisional response is received from tablet UA 120b prior to the client failure response received from the same tablet UA 120b.

If it is determined that a provisional response is not received from tablet UA 120b prior to the code 486 (Callee Busy) response received from the same tablet UA 120b, in example operation 550, control unit 332 may cause to maintain the relaying of the invite request to other associated user devices, e.g., packet switched UA 120a and/or circuit switched UA 120c, of the multiple user devices of user account 120 in lieu of the received code 486 (Callee Busy) response from tablet UA 120b.

If it is determined that a provisional response, e.g., a code 180 (Ringing) response has been received from a user device, e.g., packet switched UA 120a, prior to a client failure response, e.g., code 486 (Callee Busy) response, received from the same UA 120a, in example operation 560, control unit 332 may cause to terminate the relaying of the invite with respect to all of the multiple user devices of user account 120 responsive to the received client failure response.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
at an application server:
receiving a request for a packet switched connectivity to a user account, the user account including multiple user devices associated with one another;
relaying the request to each of the multiple user devices of the user account;
receiving a first client failure response from a first user device of the multiple user devices;
determining that a provisional response is not received from the first user device prior to the received first client failure response;
maintaining the relaying of the request to other ones of the multiple user devices in lieu of the received first client failure response;
receiving second client failure responses from remaining ones of the multiple user devices;
determining that a provisional response is not received from the remaining ones of the multiple user devices prior to the received second client failure responses; and
responsive to determining that a provisional response is not received from the remaining ones of the multiple user devices, forwarding the request to an additional user device that is different from the multiple user devices based on a call forwarding association.

2. The method of claim 1, wherein the first client failure response includes a code 486 response of a Session Initiation Protocol (SIP).

3. The method of claim 1, wherein the provisional response includes a code 18X response of a Session Initiation Protocol (SIP).

4. The method of claim 1, wherein the multiple user devices are associated with a same dial-in number under the user account.

5. The method of claim 1, wherein the first user device is configured for a network connectivity other than a packet switched based voice call connectivity.

6. The method of claim 1, wherein the packet switched connectivity is related to a voice call.

7. A telephony application server, comprising:
a radio frequency module;
a processing unit; and
a memory containing executable instructions which, when executed by the processing unit, configures the processing unit to implement an invite forking system operable to:
receive a request for a packet switched connectivity to a user account, the user account including multiple user devices associated with one another;
fork the request to each of the multiple user devices of the user account;
receive a first client failure response from a first user device of the multiple user devices;
determine whether a provisional response is received from the first user device prior to the received first client failure response;
on a condition that the provisional response is not received from the first user device prior to the received first client failure response, continue forking the request with other ones of the multiple user devices;
receive second client failure responses from remaining ones of the multiple user devices;
determine whether a provisional response is received from the remaining ones of the multiple user devices prior to the received second client failure responses; and
on a condition that the provisional response is not received from the remaining ones of the multiple user devices prior to the received second client failure responses, forwarding the request to an additional user device that is different from the multiple user devices based on a call forwarding association.

8. The telephony application server of claim 7, wherein the first client failure response includes a code 486 response of a Session Initiation Protocol (SIP).

9. The telephony application server of claim 7, wherein the provisional response includes a code 18X response of a Session Initiation Protocol (SIP).

10. The telephony application server of claim 7, wherein the first user device is configured for a network connectivity other than a packet switched based voice call connectivity.

11. The telephony application server of claim 7, wherein the radio frequency module is configured to receive the request from a cloud based network component.

12. The telephony application server of claim 7, wherein the telephony application server is a component of an IP (Internet Protocol) Multimedia Subsystem.

13. The telephony application server of claim 7, wherein the invite forking system is further operable to identify the first user device as having no packet switched connectivity configuration for voice call service based on that the first client failure response is received without the provisional response.

14. A non-transitory computer-readable medium having stored thereon computer programming instructions that, when executed by a telephony application server, cause the telephony application server to perform operations comprising:
receiving a request for a packet switched connectivity to a user account, the user account including multiple user devices associated with one another;
forking the request to each of the multiple user devices of the user account;
receiving a first client failure response from a first user device of the multiple user devices;
determining whether a provisional response is received from the first user device prior to the received first client failure response;
on a condition that the provisional response is not received from the first user device prior to the received first client failure response, continuing forking the request with other ones of the multiple user devices;
receive second client failure responses from remaining ones of the multiple user devices;
determine whether a provisional response is received from the remaining ones of the multiple user devices prior to the received second client failure responses; and
on a condition that the provisional response is not received from the remaining ones of the multiple user devices prior to the received second client failure responses, forwarding the request to an additional user device that is different from the multiple user devices based on a call forwarding association.

15. The non-transitory computer-readable medium of claim 14, wherein the first client failure response includes a code 486 response of a Session Initiation Protocol (SIP).

16. The non-transitory computer-readable medium of claim 14, wherein the provisional response includes a code 18X response of a Session Initiation Protocol (SIP).

* * * * *